Jan. 4, 1949.  R. C. KENCK  2,457,904
BUCK RAKE WINCH CLUTCH AND BRAKE CONTROL
Filed Feb. 13, 1948  2 Sheets-Sheet 1
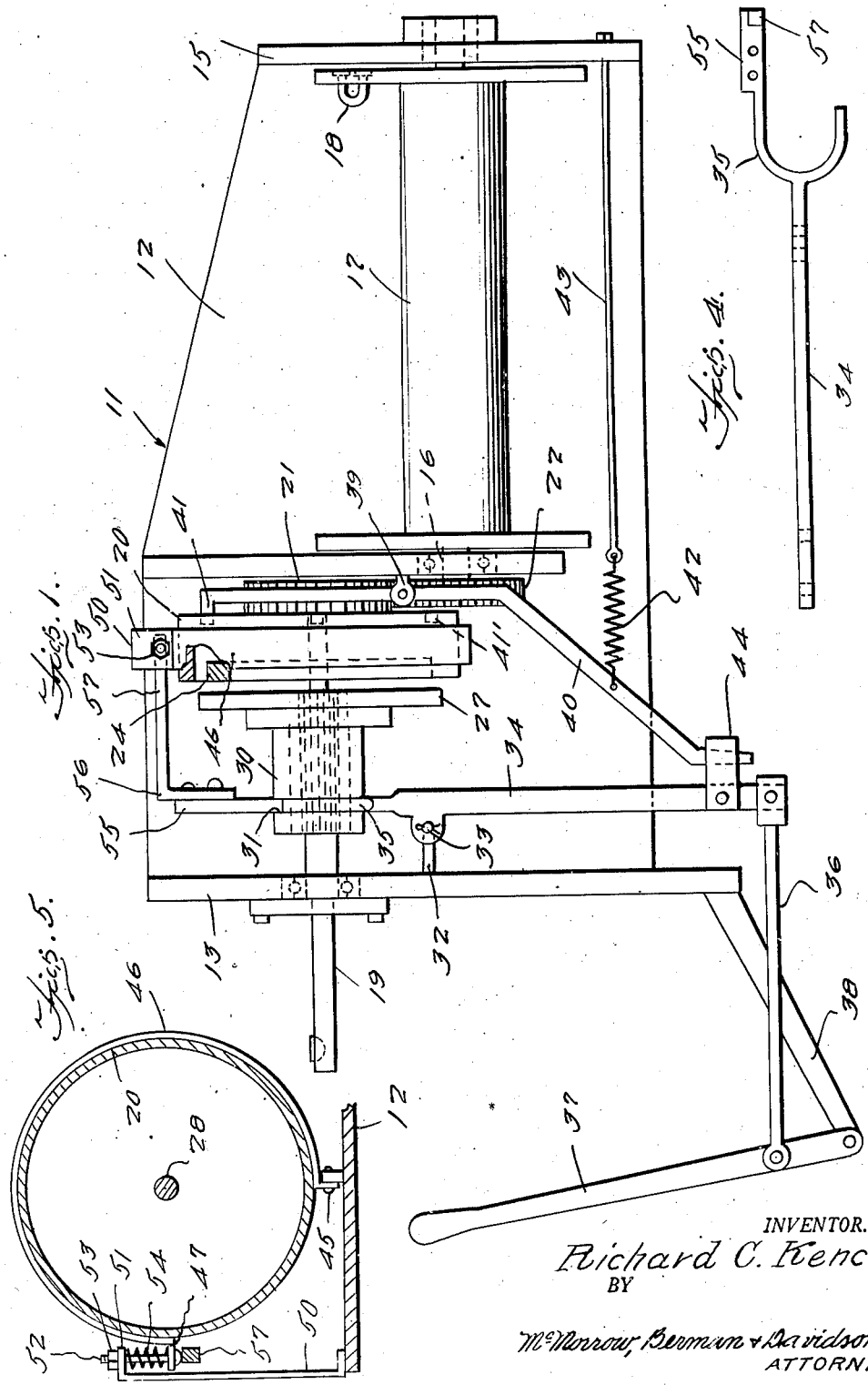
INVENTOR.
Richard C. Kenck
BY
McMorrow, Berman & Davidson
ATTORNEYS Jan. 4, 1949. R. C. KENCK 2,457,904
BUCK RAKE WINCH CLUTCH AND BRAKE CONTROL
Filed Feb. 13, 1948 2 Sheets-Sheet 2
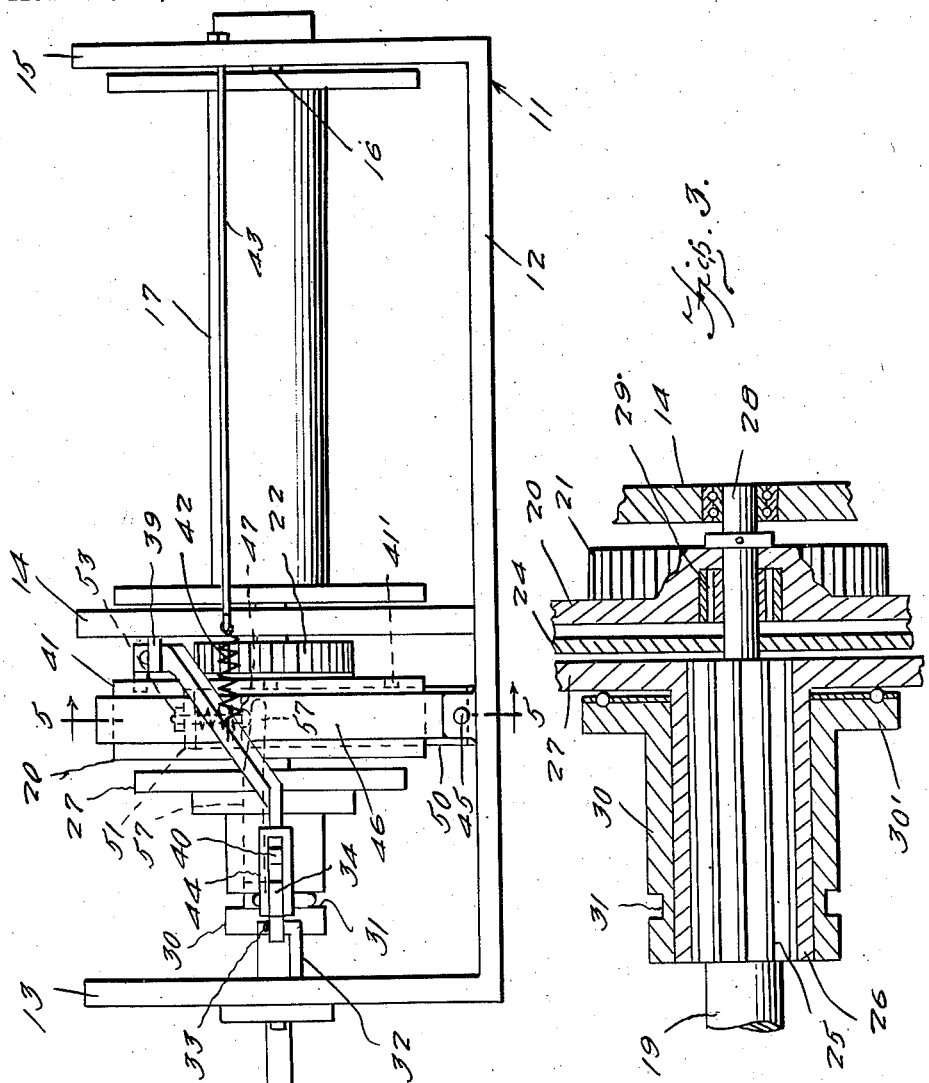
INVENTOR.
Richard C. Kenck
BY
McMorrow, Berman & Davidson
ATTORNEYS Patented Jan. 4, 1949

2,457,904

UNITED STATES PATENT OFFICE 2,457,904

BUCK RAKE WINCH CLUTCH AND BRAKE CONTROL

Richard C. Kenck, Augusta, Mont.

Application February 13, 1948, Serial No. 8,257

4 Claims. (Cl. 254—187)

1

This invention relates to hoist devices, and more particularly to a winch for use in lifting loads on power sweep rakes, bulldozers, and the like.

A main object of the invention is to provide a novel and improved winch device for use on power driven equipment such as on a buck rake, or the like, the winch device being adapted to be driven by the power-take off shaft of the machine, and being under positive control for either up or down movement of the load, the movement of the load being controlled by a simple motion of the control lever of the winch device.

A further object of the invention is to provide an improved winch device for buck rakes and similar equipment, said winch device being very simple in construction, easy to operate, and providing ability to rapidly arrest the movement of the load when it is moving downwardly, and to quickly raise said load as required.

Further objects and advantages of the invention will become apparent from the following description and claims, and from the accompanying drawings, wherein:

Figure 1 is a side elevational view partly in cross-section, of a buck rake winch device constructed in accordance with the present invention.

Figure 2 is a bottom view of the winch device of Figure 1.

Figure 3 is an enlarged cross-sectional detail view taken through the clutch sleeve portion of the buck rake winch device of Figures 1 and 2.

Figure 4 is an elevational detail view of the clutch shifter fork member employed in the winch device of Figures 1 and 2.

Figure 5 is a cross-sectional detail view taken on line 5—5 of Figure 2.

Referring to the drawings, 11 designates the supporting frame of the winch device, said frame being adapted to be installed on a buck rake or similar machine, and comprising a main plate element 12 from which project spaced parallel wall elements 13, 14 and 15. Journaled on suitable bearings in the wall elements 14 and 15 is a shaft 16 carrying between said wall elements a cable reel 17, to one flange of which a cable, not shown, may be secured by means of a U-clamp 18, whereby the cable may be wound up on the reel.

Journaled at one end portion thereof in the remaining wall element 13 is a shaft 19 adapted to be connected to the power take-off shaft of the rake, loader, or other machine on which the frame 11 is installed. Shaft 19 is reduced in diameter at its other end portion, as shown at 28 in Figure 3, said reduced end 28 being journaled in the wall element 14. Rotatively carried on said reduced end portion 28 is a drum member 20 which is intergrally formed with a gear 21. Secured to shaft 16 in the same tranverse plane as gear 21

2 is a gear 22 meshing with gear 21. Rotation of drum member 20 is therefore transmitted to reel 17 in a positive manner.

Slidably mounted on reduced shaft portion 28 inside drum member 20 is a friction disc element 24. Shaft 19 is formed with a splined portion 25 and longitudinally-slidable thereon but keyed thereto is a sleeve member 26 formed integrally with a clutch disc 27, which faces disc element 24. A roller bearing 29 rotatively supports drum member 20 on reduced shaft portion 28. Rotatively and slidably supported on sleeve member 26 is an outer flanged sleeve 30 formed with an annular groove 31. The flange of sleeve 30, indicated at 30', is located adjacent disc 27 and is provided with ball bearings at the surface thereof which faces disc 27. When sleeve 30 is moved to the right, as viewed in Figure 3, flange 30' engages disc 27, moving sleeve member 26 to the right, and flange 27 exerts axial pressure on friction disc 24, compressing it against the inside wall surface of drum member 20. This couples shaft 19 to drum member 20.

Projecting inwardly from wall element 13 is a lug 32 formed with a right-angled end portion 33, and pivotally secured on said end portion 33 is a lever member 34 having a yoke portion 35 which is received in groove 31. The other end of lever member 34 is connected by a link bar 36 to the intermediate portion of a hand lever 37, said hand lever being pivotally connected at one end thereof to an arm 38 rigidly secured to wall element 13. When lever 37 is rotated counter-clockwise, as viewed in Figure 1, lever 34 rotates clockwise around its pivotal bearing 33 and moves clutch plate 27 into engagement with friction disc element 24 and moves disc element against the inner wall surface of drum 20, whereby torque is transmitted from shaft 19 to the drum 20, as above described, thereby rotating reel 17.

Projecting inwardly from wall element 14 is a lug 39 to which is pivotally connected, for rotation in a vertical longitudinal plane, a lever 40. One end of lever 40 carries a dog 41 adapted to be received in any one of a series of openings 41' formed in the outer wall of drum 20, a spring 42 being connected between the opposite end portion of lever 40 and a rod member 43 secured to wall element 15, to bias said lever counter-clockwise, as viewed in Figure 1, whereby dog 41 is urged toward locking engagement with the openings in drum 20. The end of lever 40 adjacent spring 42 is received in a yoke 44 secured to lever 34, whereby lever 40 is rotated clockwise with lever 34 when the clutch plate 27 is moved toward disc element 24 as above described. The dog 41 is sufficiently short in length so that it is removed from the opening in drum 20 prior to the engagement of clutch plate 27 with friction disc 24.

Secured to main plate 12 at 45 and encircling the drum 20 is a brake band 46 formed at its end with an outwardly extending apertured lug 47. Secured to plate 12 is a rod member 50 formed at its end with a right angled apertured arm 51 facing lug 47. Passing slidably through lug 47 and arm 51 is a bolt 52 provided adjacent arm 51 and with a nut 53. A coiled spring 54 encircles bolt 52 and bears between arm 51 and lug 47, biasing brake band 46 into frictional engagement with drum 20.

Yoke member 35 carries an extension 55 to which is secured an L-shaped member 56 having a tapered arm 57 which engages the head of bolt 52, as shown in Figure 5. When lever 34 rotates clockwise around its pivotal bearing 33 to move the sleeve 30 to the right, as viewed in Figures 1 and 2, tapered arm 57 exerts a camming action on said bolt head and expands the brake band 46, thereby releasing the drum 20. The taper angle of arm 57 is adjusted so that the brake band is released after dog 41 leaves the aperture 41' in drum 20 but immediately prior to the engagement of clutch plate 27 with clutch disc 24.

It is thus seen that by moving hand lever 37 a small distance counter-clockwise, as viewed in Figure 1, dog 41 may be disengaged from drum 20, the load on the reel 17 being still held stationary by the braking action of brake band 46 on drum 20. Further counter-clockwise movement of hand lever 37 will release the brake band so that the load may descend freely, if so desired. Still further counter-clockwise movement of hand lever 37 will cause the clutch plate 27 to engage clutch disc 24 and reverse the free running movement of the load, causing the load to be elevated by the reel 17. Return of the hand lever 37 to its starting position will positively lock the drum 20 as soon as dog 41 re-enters an opening 41' in drum 20. By manipulating the hand lever 37 back and forth, the load may be raised or lowered as desired.

While a specific embodiment of a winch mechanism for buck rakes and the like has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A winch apparatus comprising a support, a drive shaft journaled in said support, a drum rotatably mounted on said drive shaft, a reel journaled in said support, means coupling said reel to said drum, a brake band secured to said support and encircling said drum, means biasing said brake band into braking contact with the drum, a sleeve keyed to said shaft and slidable axially thereon, a friction disc on said shaft between said sleeve and said drum and movable into engagement with said drum, a lever pivoted to said support and engaging said sleeve to move the sleeve axially responsive to rotation of said lever, and means carried by said lever and engageable with said brake biasing means for relieving the braking tension on said brake band responsive to the rotation of said lever.

2. A winch apparatus comprising a support, a drive shaft journaled in said support, a drum rotatably mounted on said drive shaft, a reel journaled in said support and coupled to said drum, a brake element engaging said drum and normally biased into braking contact therewith, a sleeve keyed to said shaft and slidable axially thereon, a friction disc on said shaft between said sleeve and said drum and movable into engagement with said drum, there being recesses formed in a wall of said drum, a locking member carried by said support and engageable in said recesses, means biasing said locking member toward recess-engaging position, a lever pivoted to said support and engaging said sleeve to move the sleeve axially responsive to rotation of said lever, and means carried by said lever and cooperating with said brake element and said locking member for moving the locking member out of recess-engaging position and relieving the braking tension on the brake element responsive to the rotation of said lever.

3. A winch apparatus comprising a support, a drive shaft journaled in said support, a drum rotatably mounted on said drive shaft, a reel journaled in said support and coupled to said drum, a brake element engaging said drum, means biasing the brake element into braking contact with said drum, there being a plurality of recesses in an end wall of said drum arranged arcuately around the axis of the drum, a locking lever pivoted to said support and engageable in said recesses, means biasing said locking lever toward recess-engaging position, a sleeve keyed to said shaft and slidable axially thereon, a friction disc on said shaft between said sleeve and said drum and movable into frictional engagement with said drum, a second lever pivoted to said support and engageable with said sleeve to move the sleeve axially responsive to rotation of said second lever, and means carried by said second lever and cooperating with said brake element and locking lever to move the locking lever out of recess-engaging position and relieve the braking force on the brake element responsive to the rotation of said second lever.

4. A winch apparatus comprising a support, a drive shaft journaled in said support, a drum rotatably mounted on said drive shaft, a reel journaled in said support and coupled to said drum, a brake band secured to said support and encircling said drum, spring means biasing said brake band into braking contact with the drum, there being a plurality of recesses in an end wall of said drum arcuately arranged around the axis of the drum, a locking lever pivoted to the support and formed with a dog portion engageable in said recesses, spring means biasing said locking lever toward recess-engaging position, a sleeve member keyed to said shaft and slidable axially thereon, a friction disc on said shaft between said sleeve member and said drum and movable into frictional engagement with the drum, a second lever pivoted to said support and engaging said sleeve member to move the sleeve member axially responsive to rotation of said second lever, means carried by said second lever and engageable with said brake band to relieve the braking tension on the brake band responsive to rotation of said second lever, and further means on said second lever engaging the locking lever to also move the locking lever out of recess-engaging position responsive to said rotation of the second lever.

RICHARD C. KENCK.

No references cited.